(12) United States Patent
Kobayashi

(10) Patent No.: US 7,688,488 B2
(45) Date of Patent: Mar. 30, 2010

(54) IMAGE READING DEVICE AND IMAGE FORMING APPARATUS INCLUDING THE SAME

(75) Inventor: Masato Kobayashi, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 431 days.

(21) Appl. No.: 11/682,092

(22) Filed: Mar. 5, 2007

(65) Prior Publication Data

US 2007/0206244 A1   Sep. 6, 2007

(30) Foreign Application Priority Data

Mar. 3, 2006   (JP)   .............................. 2006-058461
Dec. 26, 2006   (JP)   .............................. 2006-350170

(51) Int. Cl.
*H04N 1/46*   (2006.01)
*G03F 3/08*   (2006.01)
*G06K 9/00*   (2006.01)

(52) U.S. Cl. ......................... 358/514; 358/519; 382/318
(58) Field of Classification Search ................. 358/505, 358/514, 519, 1.9, 518, 530, 504, 483; 382/312, 382/318, 167, 162
See application file for complete search history.

(56) References Cited

U.S. PATENT DOCUMENTS

| | | | | | |
|---|---|---|---|---|---|
| 4,691,114 | A | * | 9/1987 | Hasegawa et al. | ........... 358/474 |
| 4,742,240 | A | * | 5/1988 | Yamanishi et al. | .......... 358/300 |
| 4,891,690 | A | * | 1/1990 | Hasegawa et al. | ........... 358/514 |
| 4,974,072 | A | * | 11/1990 | Hasegawa | .................. 358/514 |
| 5,023,711 | A | * | 6/1991 | Erhardt | ....................... 358/506 |
| 5,280,353 | A | * | 1/1994 | Baldwin | ..................... 348/674 |
| 5,313,313 | A | * | 5/1994 | Sato | ........................... 358/514 |
| 5,459,510 | A | * | 10/1995 | Hamalainen | ................. 348/322 |
| 5,914,486 | A | * | 6/1999 | Yamamoto | .................. 250/226 |
| 5,929,417 | A | * | 7/1999 | Hayashi et al. | ............. 235/454 |
| 6,590,679 | B1 | * | 7/2003 | Edgar et al. | ................. 358/514 |
| 6,639,626 | B1 | * | 10/2003 | Kubo et al. | .............. 348/218.1 |
| 6,906,702 | B1 | * | 6/2005 | Tanaka et al. | ............... 345/175 |
| 7,347,523 | B2 | * | 3/2008 | Tatsumi | ....................... 347/19 |
| 7,362,894 | B2 | * | 4/2008 | Ono et al. | .................... 382/167 |
| 2001/0003463 | A1 | * | 6/2001 | Tanimoto et al. | ............ 347/235 |
| 2002/0140830 | A1 | * | 10/2002 | Shirakawa et al. | .......... 348/245 |
| 2004/0196378 | A1 | * | 10/2004 | Kannermark et al. | .. 348/207.99 |

(Continued)

FOREIGN PATENT DOCUMENTS

JP   06-169377   6/1994

*Primary Examiner*—Madeleine A Nguyen
(74) *Attorney, Agent, or Firm*—Oblon, Spivak, McClelland, Maier & Neustadt, L.L.P.

(57) ABSTRACT

An image reading device including a plurality of image sensors configured to read image data of an original document, each of which having a reading range overlapping in a main scanning direction with an adjacent image sensor among the plurality of image sensors, and a gamma correction mechanism configured to conduct gamma correction to correct linearity of respective output characteristics of the plurality of image sensors, based on gamma correction data produced according to an output characteristic of a reference image sensor selected from the plurality of image sensors. The reference image sensor and the adjacent image sensor read identical input data, and the gamma correction mechanism compares the results, obtains a difference between the results, and adjusts the output characteristic of the adjacent image sensor to the output characteristic of the reference image sensor.

18 Claims, 15 Drawing Sheets

U.S. PATENT DOCUMENTS

| | | | |
|---|---|---|---|
| 2005/0030327 A1* | 2/2005 | Tatsumi | 347/13 |
| 2005/0178950 A1* | 8/2005 | Yoshida | 250/208.1 |
| 2007/0003302 A1* | 1/2007 | Mizes | 399/49 |
| 2007/0052813 A1* | 3/2007 | Neter | 348/222.1 |
| 2007/0195178 A1* | 8/2007 | Ooishi | 348/241 |

* cited by examiner

FIG. 10

| INPUT | CIS1 OUTOUT | CIS2 OUTPUT | CORRECTION TABLE OF CIS1-CIS2 | CORRECTED OUTPUT OF CIS2 |
|---|---|---|---|---|
| 1023 | 1023 | 1023 | 0 | 1023 |
| ⋮ | ⋮ | ⋮ | ⋮ | ⋮ |
| 718 | 718 | 512 | 206 | 718 |
| ⋮ | ⋮ | ⋮ | ⋮ | ⋮ |
| 512 | 512 | 306 | 206 | 512 |
| ⋮ | ⋮ | ⋮ | ⋮ | ⋮ |
| 306 | 306 | 154 | 152 | 306 |
| ⋮ | ⋮ | ⋮ | ⋮ | ⋮ |
| 0 | 0 | 0 | 0 | 0 |

IMAGE READING DEVICE AND IMAGE FORMING APPARATUS INCLUDING THE SAME

CROSS REFERENCE TO RELATED APPLICATIONS

The present application claims priority to Japanese patent applications no. 2006-058461, filed in the Japan Patent Office on Mar. 3, 2006, and no. 2006-350170, filed in the Japan Patent Office on Dec. 26, 2006, the disclosures of which are incorporated by reference herein in their entirety.

BACKGROUND OF THE INVENTION

1. Field of the Invention

The present invention relates to an image reading device and an image forming apparatus including the image reading device. More specifically, the present invention relates to an image reading device including a plurality of image sensors and an image forming apparatus that includes the above-described image reading device.

2. Discussion of the Related Art

A related art image reading device used for a digital copier, printer, facsimile machine, and so forth can include a linear CCD (charge coupled device) image sensor. The linear CCD image sensor can include its elemental devices for reading an image.

The linear CCD image sensor can electrically move in a main scanning direction of the image or an axial direction of an image forming component such as a photoconductor, and read the image by using an elemental device thereof. The linear CCD image sensor can also mechanically move in a sub-scanning direction of the image or a direction perpendicular to the axial direction, and read the image.

Such an image reading device can employ a dual-output type CCD image sensor or a quad-output type CCD image sensor to increase a speed for reading an image. Elemental devices of the CCD image sensor may have respectively different responses with respect to sensitivity and dark current. Further, a dual-output type CCD image sensor and a quad-output type CCD image sensor may have differences in amplifiers of an output part of each output channel, analog circuits of an analog signal processing part, and characteristics of an analog-to-digital conversion part, and so forth.

When a shading correction is conducted, concentrations of white level and black level can be corrected to respective given levels. However, the output characteristics may be different in pixels. This may cause variations or non-uniformity in grey level. Such variations or non-uniformity in grey level may produce an output image having non-uniformity, such as asymmetric concentration or streaks in a vertical direction or a sheet moving direction.

The output characteristic may represent a brightness of an original document, specifically, a relationship of an output value of a CCD image sensor with respect to an input value of the CCD image sensor. For authentically reproducing an image of an original document, it is preferable an output characteristic may show a linear form.

Techniques of related art image reading devices have proposed to use correction LUTs (look up tables) to correct difference of the characteristics of output channels.

According to one of the above-described techniques, a related art image reading device having a dual-output type CCD image sensor uses one correction LUT with respect to pixels having even numbers, and a different correction LUT with respect to pixels having odd numbers.

According to a different one of the above-described techniques, a related art image reading device having a quad-output type CCD image sensor uses different LUTs for the leading end data and trailing end data of one line data. By so doing, differences between the first half in a main scanning direction of image data and the second half in the main scanning direction of the image data may be corrected.

Related art image reading devices for handling large-sized sheets generally include a contact image sensor for reading image data while a large-sized original document is moving along a sheet moving direction. It is not preferable and practical to move an optical device over a large-sized original document since a large table for placing the original document may be needed and a carriage for moving the optical device may need to be made to fit a large-sized document.

A contact image sensor included in an image reading device that can handle both a regular-sized and large-sized sheets may need to have a width or distance in a main scanning direction greater than or equal to the width of a large-sized original document. For example, for reading an A0 size original document, the width of a contact image sensor may need to be greater than or equal to 841 mm. In this case, one contact image sensor may not be technically sufficient. In addition, the cost for the contact image sensor may increase.

To avoid such insufficiency in technique and increase in cost, a plurality of small contact image sensors may be aligned in the main scanning direction. The plurality of small contact image sensors may receive light beams emitted thereto while reading an original document, form an image of the original document thereon, and electrically connect image signals read by the plurality of small contact image sensors. By conducting the above-described operation, image data corresponding to the entire scanning lines may be obtained.

In such image reading device including a plurality of image sensors, as described above, each of the image sensors may have respectively different responses with respect to sensitivity, and have difference in amplifier of an output part of each output channel, analog circuit of an analog signal processing part, and characteristic of an analog-to-digital conversion part, and so forth.

Therefore, when a shading correction is conducted, concentrations of white level and black level may be corrected to respective given levels. However, the output characteristics may be different in pixels. This may cause variations or non-uniformity in grey level. Such variations or non-uniformity in grey level may produce an output image having non-uniformity and different concentrations.

SUMMARY OF THE INVENTION

Exemplary aspects of the present invention have been made in view of the above-described circumstances.

Exemplary aspects of the present invention provide an image reading device that can effectively perform gamma correction by adjusting an output characteristic of an image sensor with gamma correction data obtained according to a gamma characteristic of a reference image sensor.

Other exemplary aspects of the present invention provide an image forming apparatus that can provide a high quality image having no difference in characteristics of the image sensors provided to the above-described image reading device.

In one exemplary embodiment, an image reading device includes a plurality of image sensors configured to read image data of an original document, each of which having a reading range overlapping in a main scanning direction with an adjacent image sensor among the plurality of image sensors, and a gamma correction mechanism configured to conduct gamma correction to correct linearity of respective output characteristics of the plurality of image sensors, based on gamma correction data produced according to an output characteristic of a reference image sensor selected from the plurality of image sensors.

The adjacent image sensor may include a correction target image sensor among the plurality of image sensors. The reference image sensor and the correction target image sensor may read identical input data, and the gamma correction mechanism may compare output data of the reference image sensor and output data of the correction target image sensor, obtain a difference between these output data, and adjust the output characteristic of the correction target image sensor to the output characteristic of the reference image sensor.

The gamma correction data may be produced based on a gamma characteristic of the reference image sensor according to a single selected pixel of the image data read the reference image sensor.

The above-described image reading device may further include a specifying mechanism configured to specify a position of the single selected pixel so as to obtain the gamma characteristic.

The single selected pixel of the image data read by the reference image sensor may be located in an overlapped portion of the reference image sensor and the adjacent image sensor.

The single selected pixel of the image data read by the reference image sensor may be located outside an overlapped portion of the reference image sensor and the adjacent image sensor.

The gamma correction data may be produced based on a gamma characteristic of the reference image sensor obtained according to an average value of a plurality of randomly selected pixels of the image data read by the reference image sensor.

The above-described image reading device may further include a specifying mechanism configured to specify a number of the plurality of randomly selected pixels so as to obtain the gamma characteristic.

The above-described image reading device may further include a specifying mechanism configured to specify a position of the plurality of randomly selected pixels so as to obtain the gamma characteristic.

The plurality of randomly selected pixels of the image data read by the reference image sensor may be located in an overlapped portion of the reference image sensor and the adjacent image sensor.

The plurality of randomly selected pixels of the image data read by the reference image sensor may be located outside an overlapped portion of the reference image sensor and the adjacent image sensor.

The gamma correction data may be produced based on a gamma characteristic of the reference image sensor obtained according to an average value of a plurality of sequentially arranged selected pixels of the image data read by the reference image sensor.

The above-described image reading device may further include a specifying mechanism configured to specify a number of the plurality of sequentially arranged selected pixels so as to obtain the gamma characteristic.

The above-described image reading device may further include a specifying mechanism configured to specify a position of the plurality of sequentially arranged selected pixels so as to obtain the gamma characteristic.

The plurality of sequentially arranged selected pixels of the image data read by the reference image sensor may be located in an overlapped portion of the reference image sensor and the adjacent image sensor.

The plurality of sequentially arranged selected pixels of the image data read by the reference image sensor may be located outside an overlapped portion of the reference image sensor and the adjacent image sensor.

The gamma correction data may include a previously given gamma characteristic.

The gamma correction data may be produced by using patterns provided internally.

Further, in one exemplary embodiment, an image forming apparatus includes an image forming device configured to perform a series of image forming operations, and an image reading device. The image reading device includes a plurality of image sensors configured to read image data of an original document, each of which have a reading range overlapping in a main scanning direction with an adjacent image sensor among the plurality of image sensors, and a gamma correction mechanism configured to conduct gamma correction to correct linearity of respective output characteristics of the plurality of image sensors, based on gamma correction data produced according to an output characteristic of a reference image sensor selected from the plurality of image sensors.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a table showing data obtained by reading the test chart of FIG. 9 with the image sensors of FIG. 9;

DETAILED DESCRIPTION OF THE PREFERRED EMBODIMENTS

Figure 1:
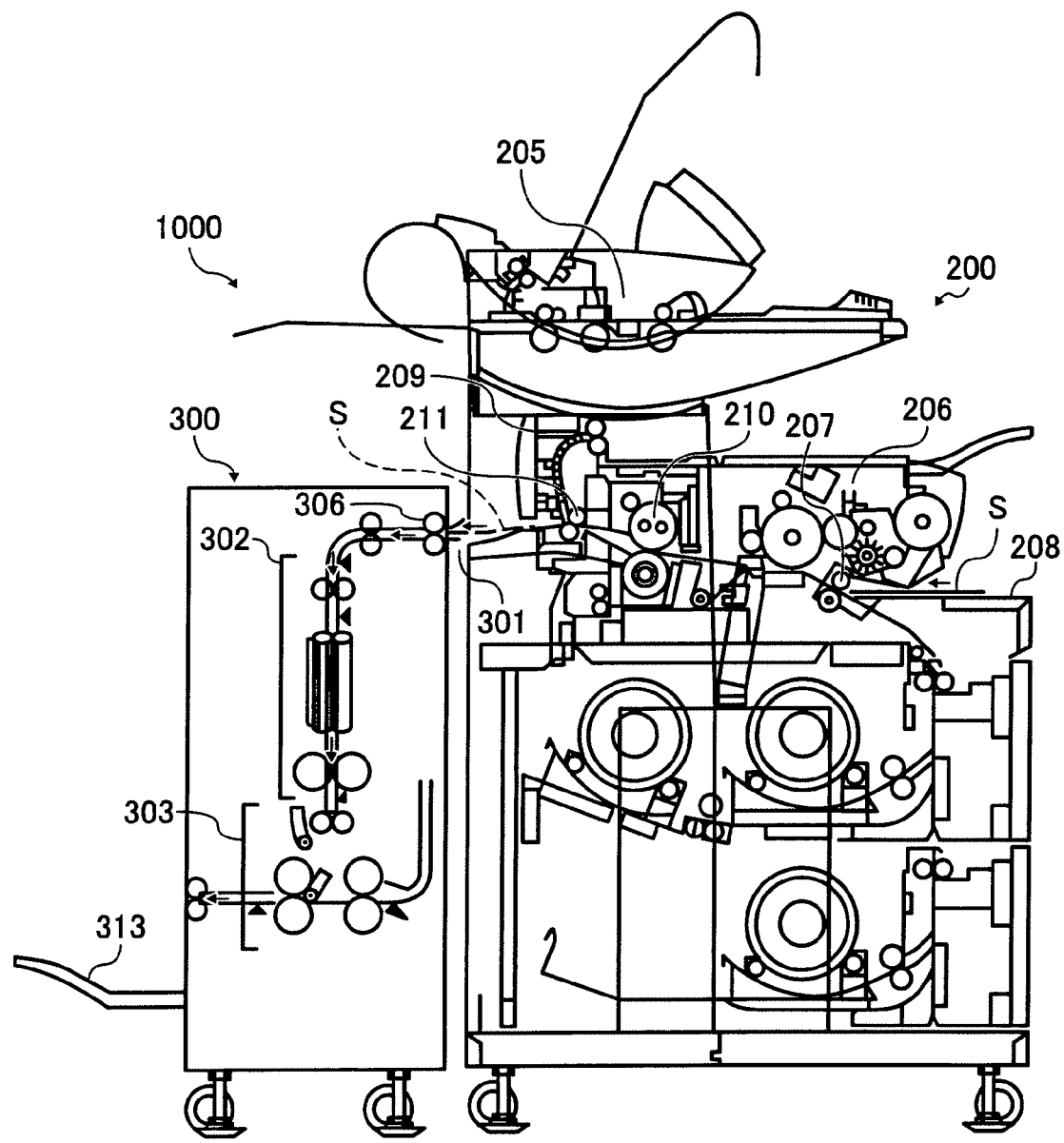
FIG. 1 is a schematic construction of an image forming system including an image forming apparatus according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, preferred embodiments of the present invention are described.

Referring to FIG. 1, a schematic structure of an image forming system 1000 is described.

In FIG. 1, the image forming system 1000 includes an image forming apparatus 200 and a sheet finishing apparatus 300. The sheet finishing apparatus 300 is connected to the image forming apparatus 200 and the sheet finishing apparatus 300 is configured to perform a sheet end folding and an accordion folding.

The sheet finishing apparatus 300 includes a connection part 301, a sheet end folding part 302, an accordion folding part 303, and a tray 313. The connection part 301 connects the image forming apparatus 200 and the sheet finishing apparatus 300. The sheet end folding part 302 conducts a sheet end folding for folding a leading end portion of a recording sheet S that serves as a recording medium. The accordion folding part 303 conducts an accordion folding for folding a recording sheet S into an accordion shape in a traveling direction of the recording sheet S. The tray 313 receives and stacks the folded recording sheet thereon.

The image forming apparatus 200 includes an image reading device 205, an image forming device 206, a pair of registration rollers 207, a manual sheet feeder 208, an upper sheet discharging roller 209, a fixing device 210, and a lower sheet discharging roller 211.

The pair of registration rollers 207 can stop a recording sheet S at a nip formed therebetween and feed the recording sheet S by synchronizing with an operation of the image forming device 206 so that the recording sheet S can be conveyed toward the image forming device 206.

The manual sheet feeder 208 is arranged below the image reading device 205. When a recording sheet S is set on the manual sheet feeder 208, the recording sheet S is stopped at the nip formed between the pair of registration rollers 207, fed by the pair of registration rollers 207 in synchronization with an operation of the image forming device 206, and conveyed to the image forming device 206.

The image forming device 206 can perform a series of image forming operations. Specifically, an image bearing member or a photoconductor (not shown) can form an electrostatic latent image on a surface thereof according to corresponding image data. A developing unit (not shown) can develop the electrostatic latent image into a visible toner image with toner. The visible toner image can be transferred onto a recording sheet S, then conveyed to the fixing device 210.

The fixing device 210 fixes the visible toner image transferred on the recording sheet S. The recording sheet S having the fixed toner image thereon is conveyed by the lower sheet discharging roller 211.

When the recording sheet S is further processed for folding, the recording sheet S is conveyed to the sheet finishing apparatus 300.

When the recording sheet S is discharged, the recording sheet S is guided by a separator (not shown) and discharged by the upper sheet discharging roller 209 to a sheet stack (not shown) in the image forming apparatus 200.

After the recording sheet S has been conveyed into the sheet finishing apparatus 300, a pair of sheet conveying rollers 306 may convey the recording sheet S to the sheet end folding part 302. In the sheet end folding part 302, the recording sheet S is folded at the leading end portion thereof. Then, the recording sheet S with the leading end portion folded is conveyed to the accordion folding part 303. In the accordion folding part 303, the recording sheet S is folded in an accordion shape in a traveling direction of the recording sheet S. The recording sheet S folded in an accordion shape is then conveyed to the tray 313 to be stacked.

Figure 2:
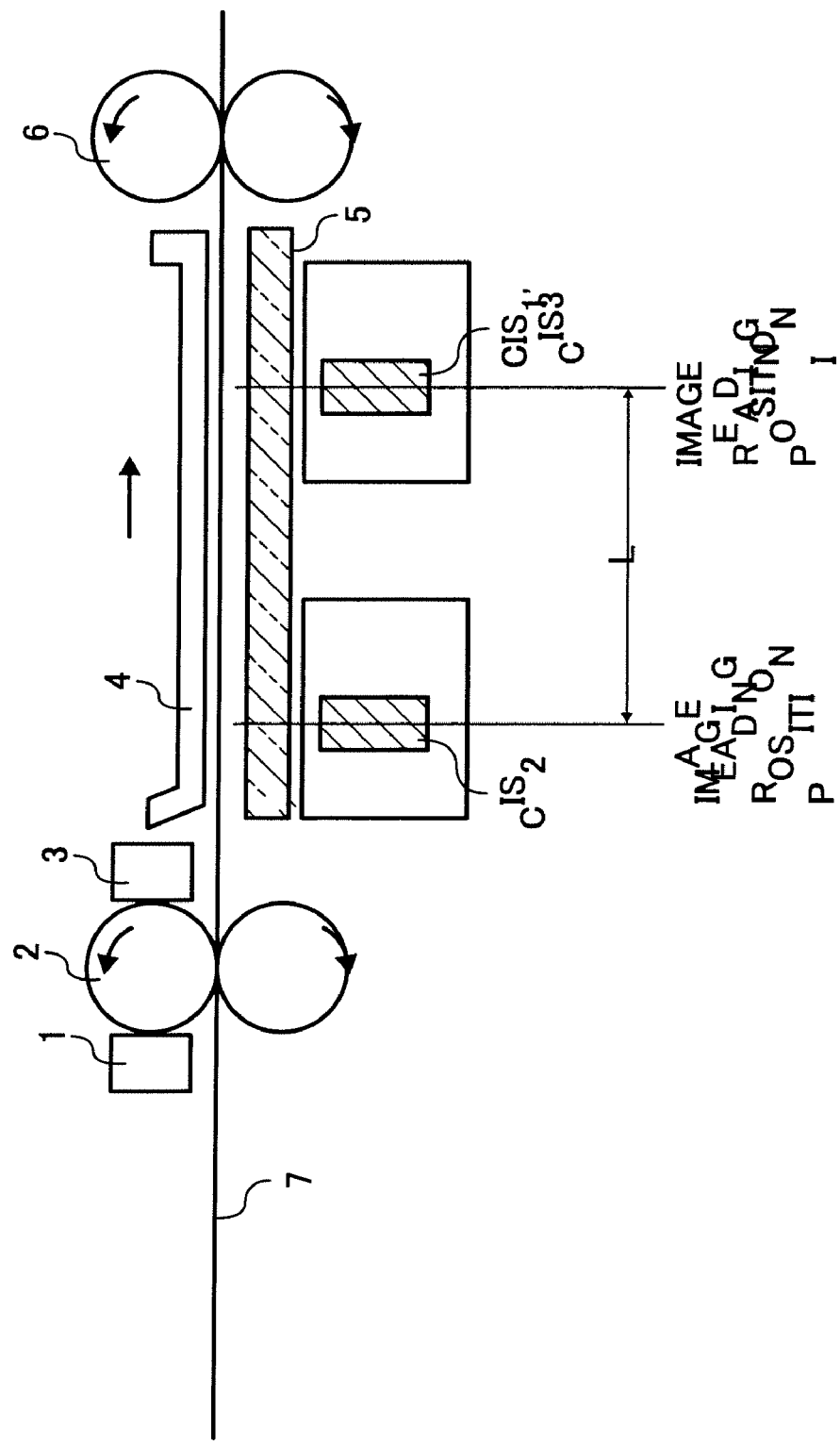
FIG. 2 is a partial cross sectional view of an image reading device, according to an exemplary embodiment of the present invention, included in the image forming apparatus of FIG. 1.
Figure 3:
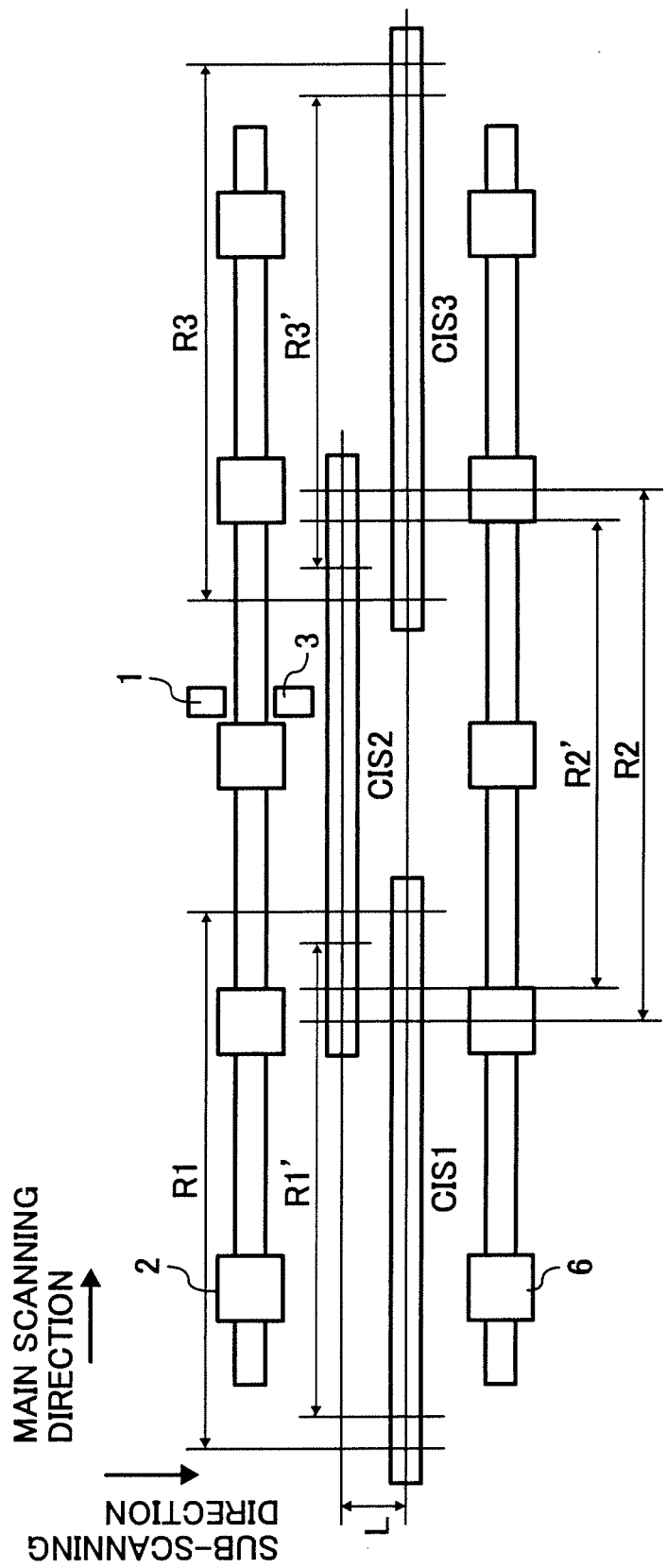
FIG. 3 is a top plan view of the image reading device of FIG. 2.

Referring to FIGS. 2 and 3, a schematic configuration of the image reading device 205 according to one exemplary embodiment of the present invention is described. FIG. 2 is a partial cross sectional view of the image reading device 205, and FIG. 3 is a top plan view of the image reading device 205 of FIG. 2.

In FIGS. 2 and 3, the image reading device 205 includes a document inlet sensor 1, a first pair of conveying rollers 2, a registration sensor 3, a contact glass cover 4, a contact glass 5, and a second pair of conveying rollers 6.

The document inlet sensor 1 is disposed at an upstream side of the first pair of conveying rollers 2. The registration sensor 3 is disposed at a downstream side of the first pair of conveying rollers 2. The first and second pairs of conveying rollers 2 and 6 are rotated in a direction indicated by respective arrows in FIG. 2. The contact glass 5 and the contact glass cover 4 are disposed facing each other.

An original document 7 travels in a sheet traveling path under or between the above-described components. Specifically, the original document 7 can pass under the document inlet sensor 1, between the first pair of conveying rollers 2, under the registration sensor 3, between the contact glass cover 4 and the contact glass 5, and between the second pair of conveying rollers 6.

The contact glass 5 can have two sides: one of which is an upper surface facing the contact glass cover 4, and the other of which is a lower surface that mounts first, second, and third contact image sensors CIS1, CIS2, and CIS3 thereon. The first, second, and third contact image sensors CIS1, CIS2, and CIS3 can arranged in a zigzag alignment in a main scanning direction of the original document 7 (see FIG. 6).

The second contact image sensor CIS2 are disposed at an upstream side in a traveling direction of the original document 7 along a sub-scanning direction indicated by an arrow shown in FIG. 2. The first and third contact image sensors CIS1 and CIS3 are disposed at a downstream side in the traveling direction of the original document 7 with a distance L away from the second contact image sensor CIS2. The distance L can indicate a distance between an image reading position of the second contact image sensor CIS2 and respective image reading positions of the first and third contact image sensors CIS1 and CIS3.

As shown in FIG. 3, the first, second, and third contact image sensors CIS1, CIS2, and CIS3 can have first, second, and third effective reading ranges R1, R2, and R3 overlapping with its adjacent contact image sensor(s) in the main scanning direction of the original document 7. Specifically, the first effective reading range R1 of the first contact image sensor CIS1 can overlap with the second effective reading range R2 of the second contact image sensor CIS2. The third effective reading range R3 of the third contact image sensor CIS3 can also overlap with the second effective reading range R2 of the second contact image sensor CIS2.

Further, the first, second, and third contact image sensors CIS1, CIS2, and CIS3 can have first, second, and third document reading ranges R1', R2', and R3, respectively, overlapping with its adjacent contact image sensor(s) in the main scanning direction of the original document 7. The first, second, and third document reading ranges R1', R2', and R3' can located within the first, second, and third effective reading ranges R1, R2, and R3, respectively. Specifically, the first document reading range R1' included in the first effective reading range R1 of the first contact image sensor CIS1 can overlap with the second document reading range R2' included in the second effective reading range R2 of the second contact image sensor CIS2. The third document reading range R3' included in the third effective reading range R3 of the third contact image sensor CIS3 can also overlap with the second document reading range R2' included in the second effective reading range R2 of the second contact image sensor CIS2.

In the image reading device 205 having the above-described configuration, an original document 7 having an image on a face-down side thereon, for example, is read as follows. Firstly, the original document 7 starts traveling from the left side of the image reading device 205 in FIG. 1, which is from the upper side of the image reading device 205 in FIG. 3. The original document 7 is conveyed toward a nip formed between the first pair of conveying rollers 2.

After the document inlet sensor 1 has detected the original document 7, a conveyance motor (not shown) starts rotating the first and second pairs of conveying rollers 2 and 6, then respective light sources in the first, second, and third contact image sensors CIS1, CIS2, and CIS3 are turned on. Each light source illuminates the original document 7. Then, the registration sensor 3 detects the leading end portion of the original document 7 to sequentially sense a position of the original document in the sheet traveling path.

While passing between the contact glass 5 and the contact glass cover 4, the image formed on the face-down side of the original document 7 is read or scanned by the second contact image sensor CIS2. After the second contact image sensor CIS2, the image on the original document 7 is read or scanned by the first and third contact image sensors CIS1 and CIS3. A read signal or scanned signal obtained by the second contact image sensor CIS2 delays by a time period for reading or scanning a distance between the first and second contact image sensors CIS1 and CIS2 in the sub-scanning direction. The distance corresponds to the distance L. Similarly, read signals or scanned signals obtained by the first and third contact image sensors CIS1 and CIS3 delay by a time period for reading or scanning a distance between the first and third contact image sensors CIS1 and CIS3 in the sub-scanning direction. Then, the read signals of the first, second, and third contact image sensors CIS1, CIS2, and CIS3 are composed or synthesized to obtain a synthesized signal in one line.

The original document 7 is sequentially read while moving in the sub-scanning direction. After the original document 7 has passed through between the second pair of conveying rollers 6, the original document 7 is discharged to an outside of the image reading device 205.

In FIG. 3, the original document 7 travels from the upper side to the lower side in the drawing sheet.

Figure 4:
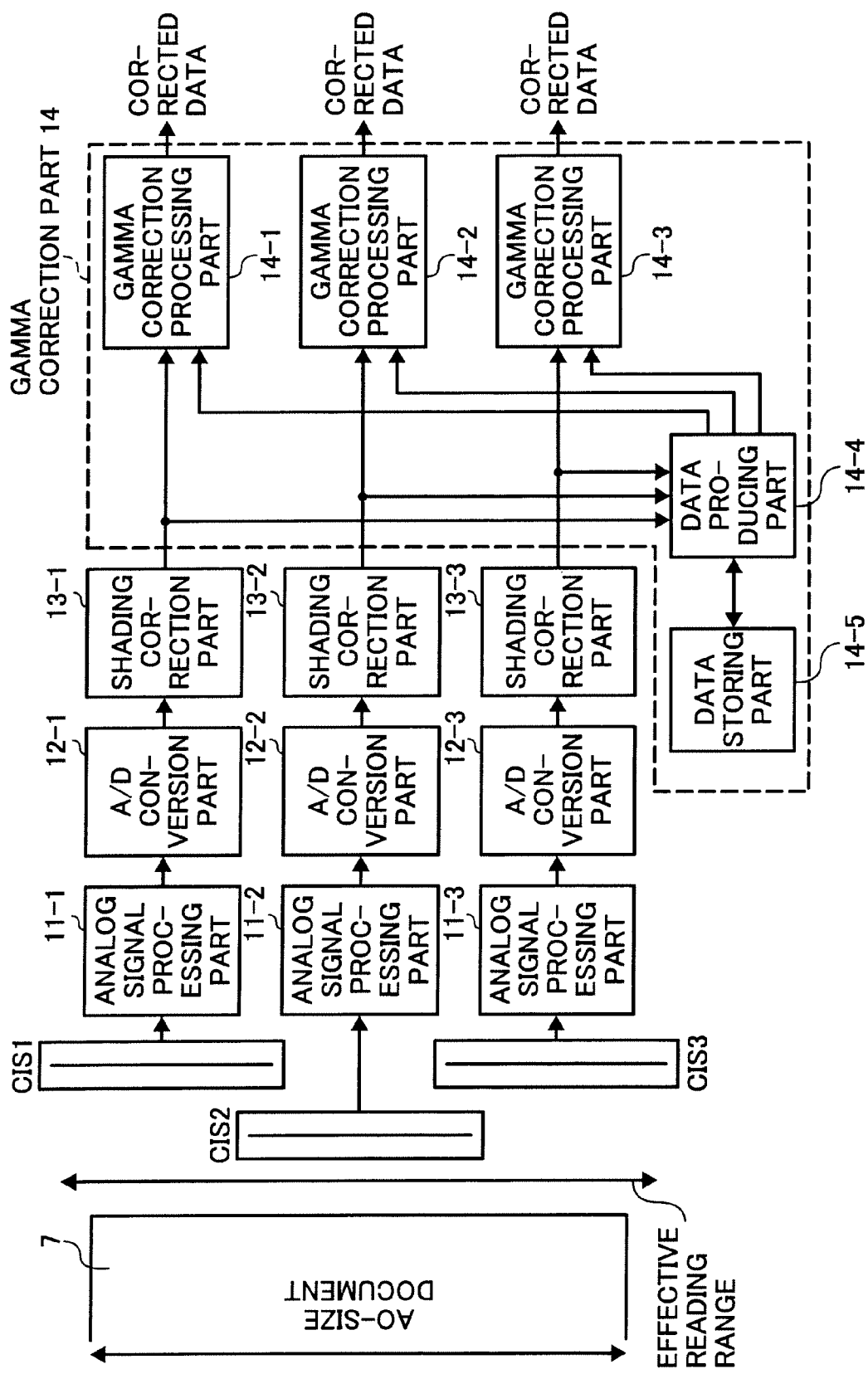
FIG. 4 is a block diagram showing an electrical configuration of the image reading device.

Referring to FIG. 4, a block diagram showing an electrical configuration of the image reading device 205 is described. The image reading device 205 includes the first, second, and third contact image sensors CIS1, CIS2, and CIS3, an analog signal processing part 11, an analog-to-digital conversion part or A/D conversion part 12, a shading correction part 13, and a gamma correction part 14.

The analog signal processing part 11, the A/D conversion part 12, and the shading correction part 13 are provided to each of the first, second, and third contact image sensors CIS1, CIS2, and CIS3. Hereinafter, the respective analog signal processing part 11, the A/D conversion part 12, and the shading correction part 13 for each of the first, second, and third contact image sensors CIS1, CIS2, and CIS3 are referred to with respective corresponding reference number, when necessary, in the specification and the related drawings. Specifically, the first contact image sensor CIS1 includes an analog signal processing part 11-1, an A/D conversion part 12-1, and a shading correction part 13-1. The second contact image sensor CIS2 includes an analog signal processing part 11-2, an A/D conversion part 12-2, and a shading correction part 13-2. The third contact image sensor CIS3 includes an analog signal processing part 11-3, an A/D conversion part 12-3, and a shading correction part 13-3.

Respective image data is output from the first, second, and third contact image sensors CIS1, CIS2, and CIS3.

The analog signal processing parts 11-1, 11-2, and 11-3 respectively conduct image denoising or noise rejection, signal amplification, and so forth with respect to the respective image data output from the first, second, and third contact image sensors CIS1, CIS2, and CIS3.

After completing the operation in the analog signal processing parts 11-1, 11-2, and 11-3, the A/D conversion parts 12-1, 12-2, and 12-3 conduct analog-to-digital conversion to the respective image data. Then, the respective image data is input to the shading correction parts 13-1, 13-2, and 13-3.

The shading correction parts 13-1, 13-2, and 13-3 conduct shading correction to correct the respective image data from the A/D conversion parts 12-1, 12-2, and 12-3. Specifically, shading correction parts 13-1, 13-2, and 13-3 correct white level and black level of concentrations in the respective image data to a given level. Then, the respective image data is sent to an input to a gamma correction part 14.

The gamma correction part 14 includes gamma correction processing parts 14-1, 14-2, and 14-3, a gamma correction data producing part 14-4, and a gamma correction data storing part 14-5. The gamma correction processing parts 14-1, 14-2, and 14-3 conduct gamma correction. The gamma correction data producing part 14-4 produce gamma correction data necessary for gamma correction. Details of the gamma correction data producing part 14-4 will be described later. The gamma correction data storing part 14-5 stores the gamma correction data obtained by the gamma correction data producing part 14-4.

Figure 5:
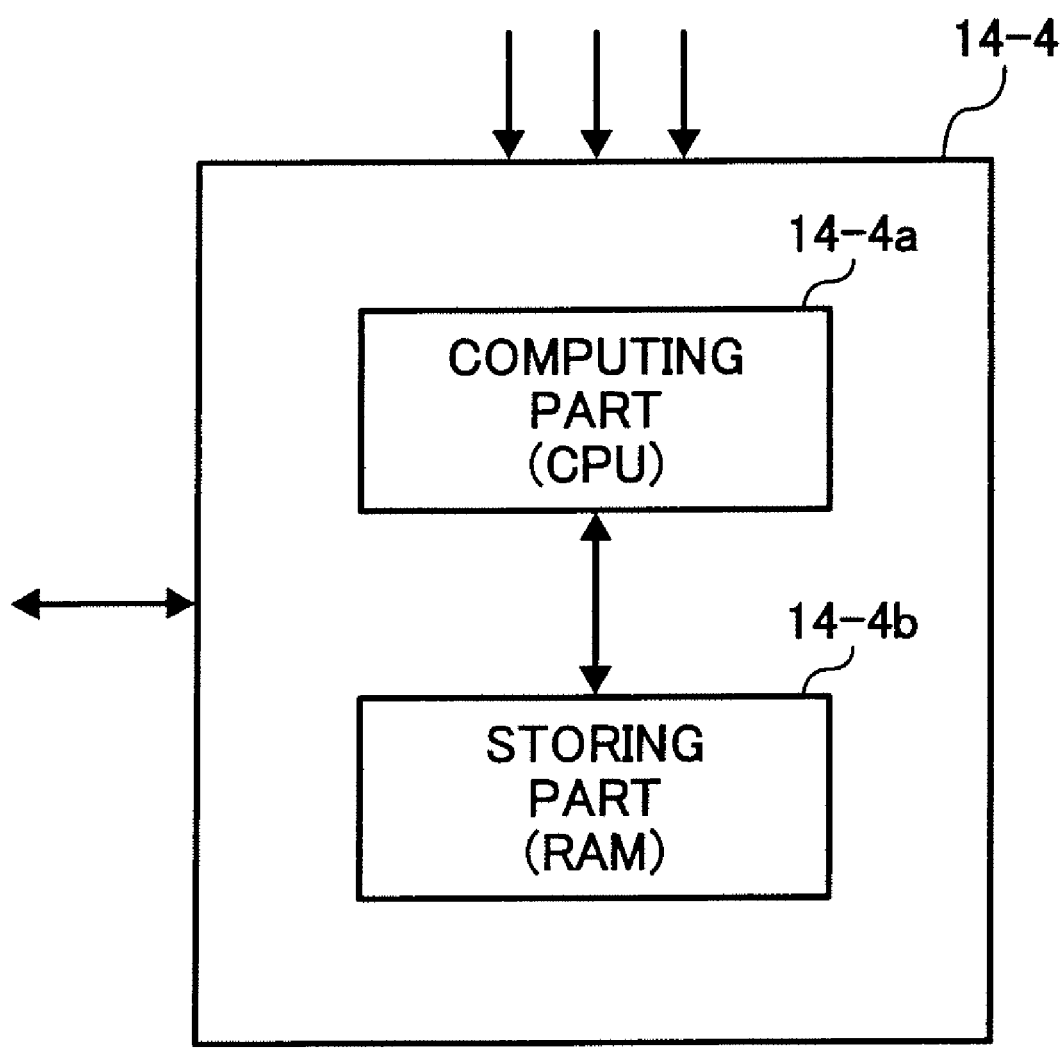
FIG. 5 is a detailed block diagram of a gamma correction data producing part included in the electrical configuration of FIG. 4.

Referring to FIG. 5, a detailed block diagram of the gamma correction data producing part 14-4 of FIG. 4 is described.

In FIG. 5, the gamma correction data producing part 14-4 includes a computing part 14-4a and a storing part 14-4b. The computing part 14-4a includes a central processing unit or CPU. The storing part 14-4b includes a random access memory or RAM. The gamma correction data producing part 14-4 uses the gamma correction data previously stored in the gamma correction data storing part 14-5 so as to produce gamma correction data with respect to the shading correction data input from the shading correction parts 13-1, 13-2, and 13-3.

Figure 6:
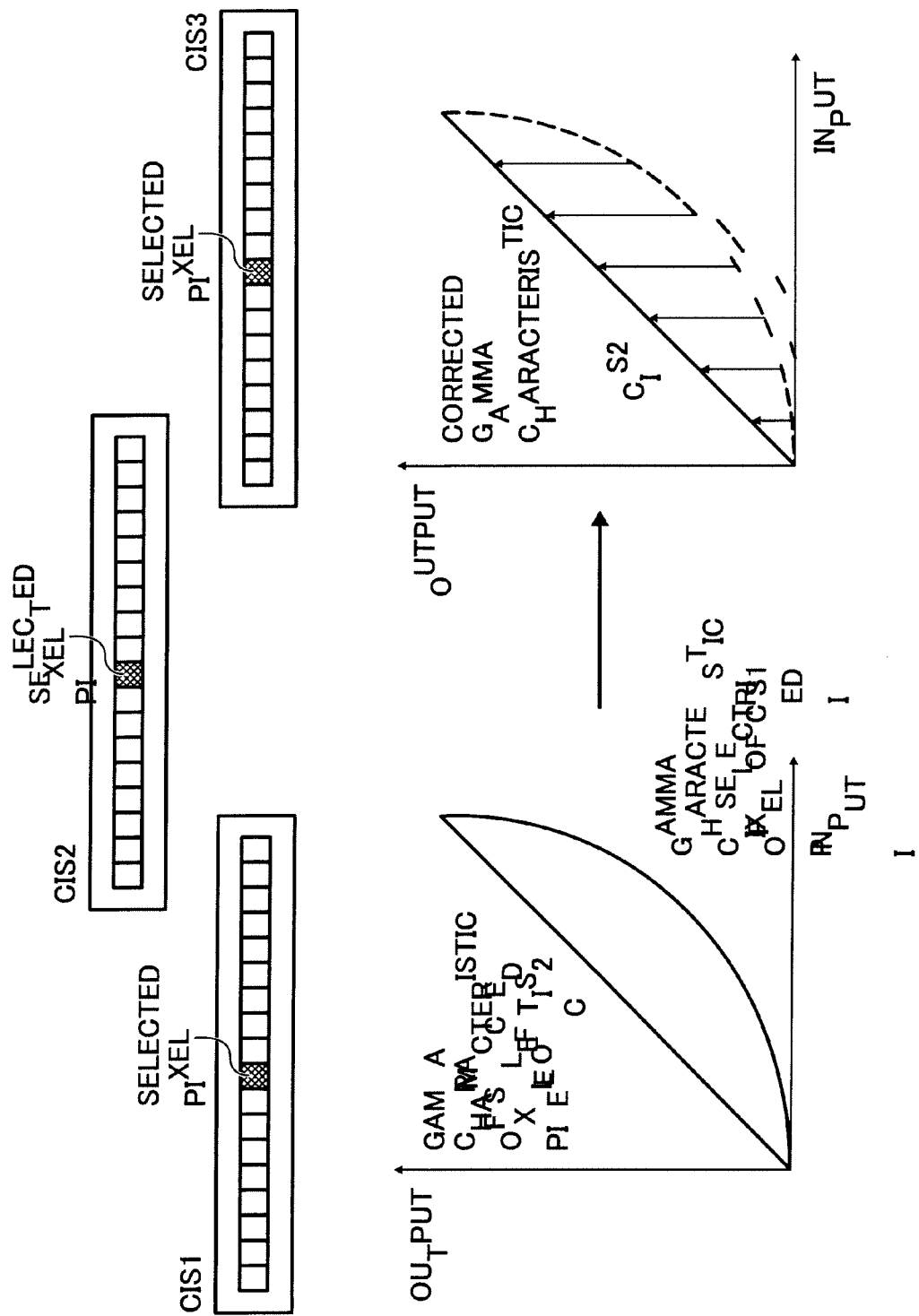
FIG. 6 is a schematic diagram showing a fundamental rule of gamma correction.

Referring to FIG. 6, functions of the gamma correction part 14 are described. FIG. 6 shows a fundamental rule of gamma correction when correcting a gamma characteristic of an image sensor to that of another image sensor.

In FIG. 6, each of the first, second, and third contact image sensors CIS1, CIS2, and CIS3 have a selected pixel among the whole of pixels in each image sensor.

In this case, the selected pixel of the second contact image sensor CIS2 represents a reference pixel or a criterion.

Gamma correction data is used to correct a gamma characteristic of the selected pixel of each of the first, second, and third contact image sensors CIS1, CIS2, and CIS3. For example, as shown in FIG. 6, the gamma characteristic of the selected pixel of the first contact image sensor CIS1 can be effectively corrected to the gamma characteristic of the selected reference pixel of the second contact image sensor CIS2.

Figure 7:
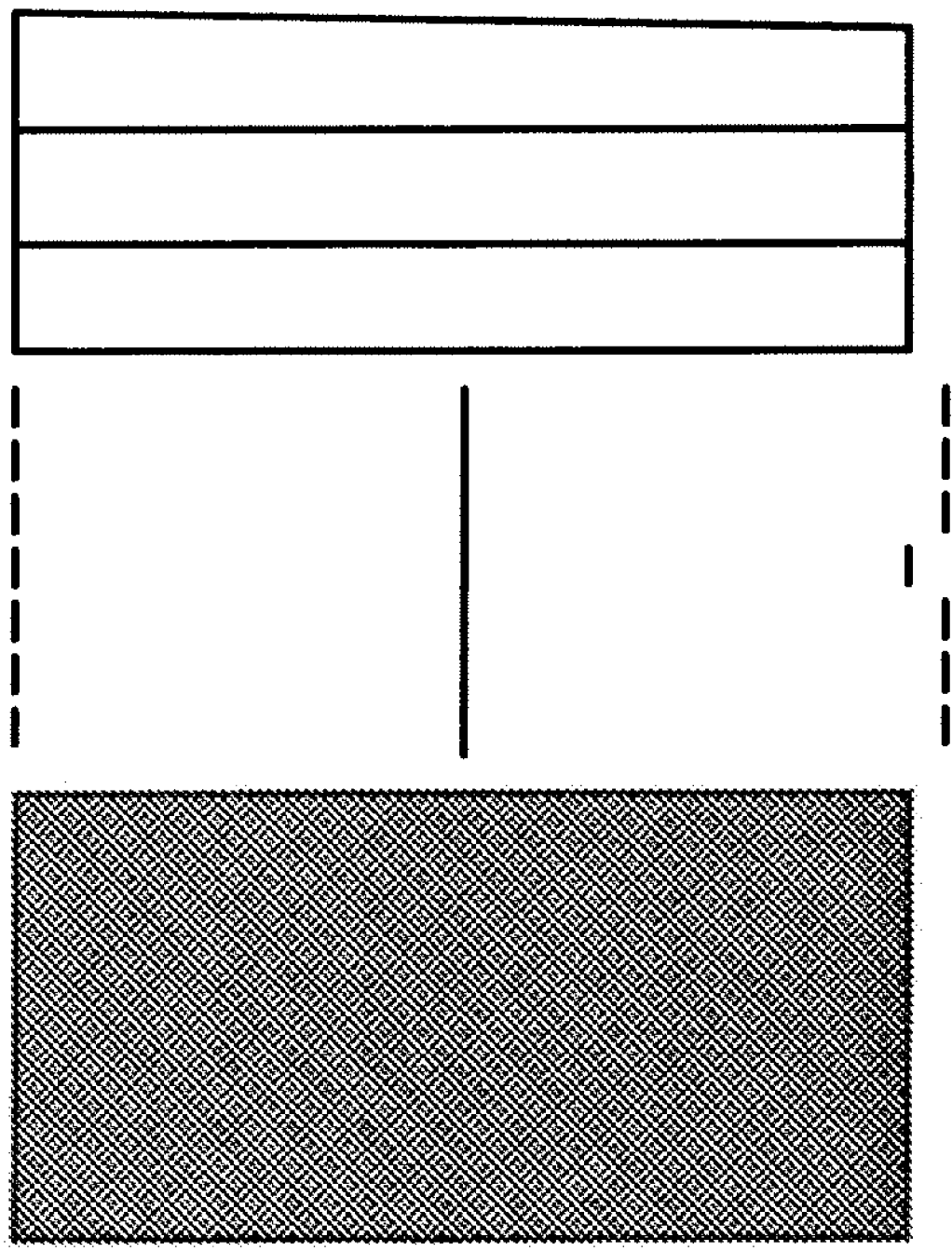
FIG. 7 is a schematic diagram showing an example of a test chart.

Referring to FIG. 7, an example of a test chart including a plurality of concentration patterns is shown.

The gamma correction part 14 (shown in FIG. 4) can produce gamma correction data based on output data obtained by reading a test chart such as the test chart of FIG. 7 or an internal pattern that includes a plurality of concentration patterns and output by the image reading device 205 or the image forming apparatus 200.

Figure 8:
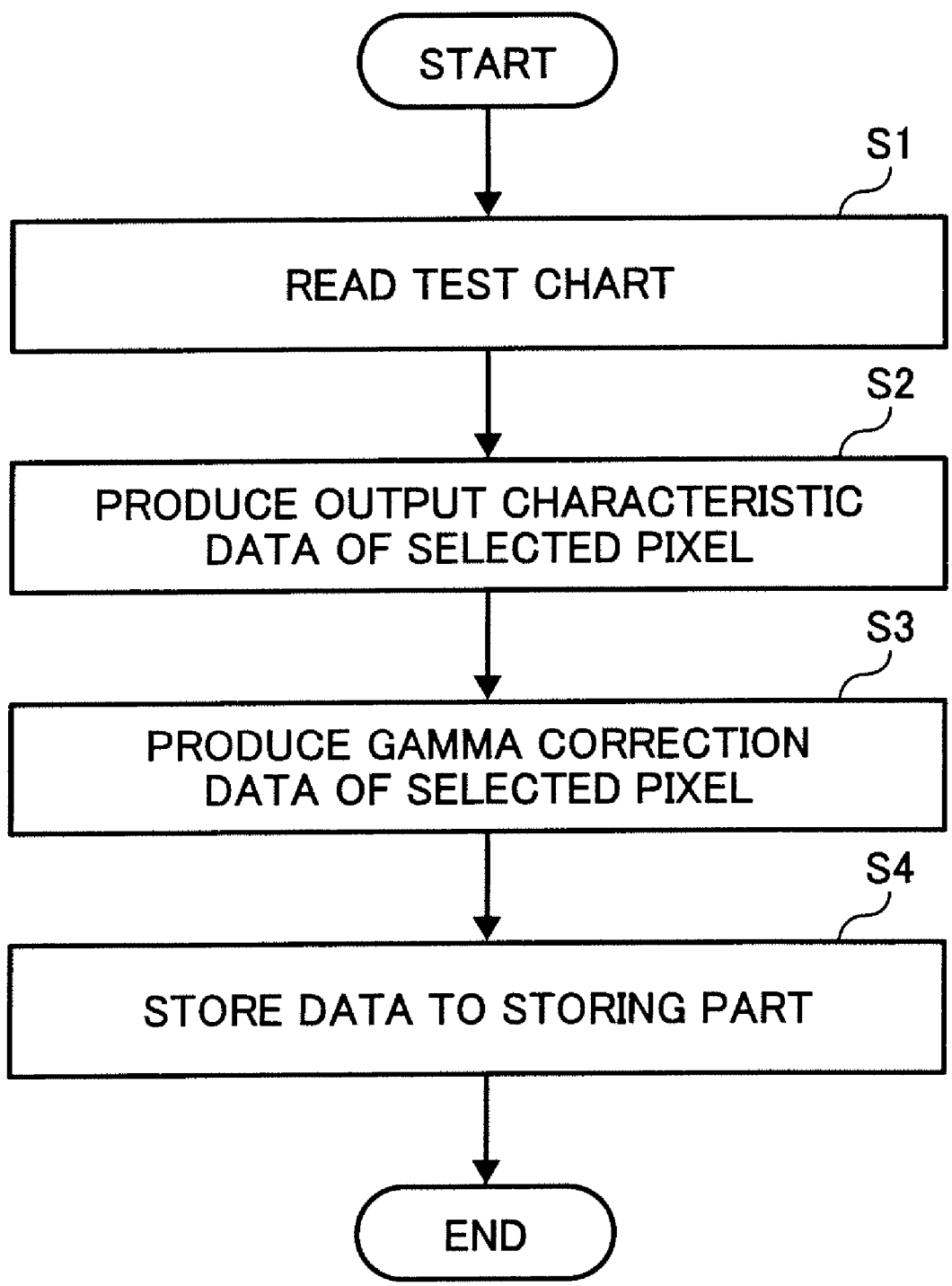
FIG. 8 is a flowchart showing an operation process for producing gamma correction data for conducting the gamma correction shown in the fundamental principle of FIG. 6.

Referring to FIG. 8, a flowchart showing an operation process for producing gamma correction data for conducting the gamma correction shown in the fundamental principle of FIG. 6 is described.

In step S1 of the flowchart of FIG. 8, the gamma correction part 14 reads a test chart such as the test chart of FIG. 7, and the process proceeds to step S2.

In step S2, the gamma correction part 14 produces output characteristic data of respective selected pixels designated in the first, second, and third contact image sensors CIS1, CIS2, and CIS3. Then, the process goes to step S3.

In step S3, when a selected pixel of the second contact image sensor CIS2 corresponds to a reference pixel, the gamma correction data producing part 14-4 produces respective gamma correction data of the first and third contact image sensors CIS1 and CIS3, such that respective gamma characteristics of the selected pixels of the first and third contact image sensors CIS1 and CIS3 are equal to the gamma characteristic of the selected standard pixel of the second contact image sensor CIS2.

Then, in step S4, the respective gamma correction data is stored in the gamma correction data storing part 14-5, and the process completes.

For a regular reading operation, the above-described gamma correction data stored in the gamma correction data storing part 14-5 can be used to conduct gamma correction with respect to the respective selected pixels of the first and third contact image sensors CIS1 and CIS3. When conducting the gamma correction, the gamma correction data producing part 14-4 corrects the gamma characteristic of the selected pixel of the first contact image sensor CIS1 to become equal to the gamma characteristic of the selected reference pixel of the second contact image sensor CIS2, as shown in FIG. 6.

By conducting the above-described gamma correction, the gamma characteristic of the first contact image sensor CIS1 is equal to or same as the gamma characteristic of the second contact image sensor CIS2.

Similarly, the gamma correction data producing part 14-4 can correct the gamma characteristic of the selected pixel of the third contact image sensor CIS3 to become equal to the gamma characteristic of the selected reference pixel of the second contact image sensor CIS2. Thereby, the gamma characteristic of the third contact image sensor CIS3 is equal to or same as the gamma characteristic of the second contact image sensor CIS2.

As a result, the gamma correction can be conducted with a constantly equal or same gamma characteristic correction across the entire width or main scanning direction of the original document 7.

Referring to FIGS. 9 through 12, a detailed explanation of the above-described gamma correction is described.

Figure 9:
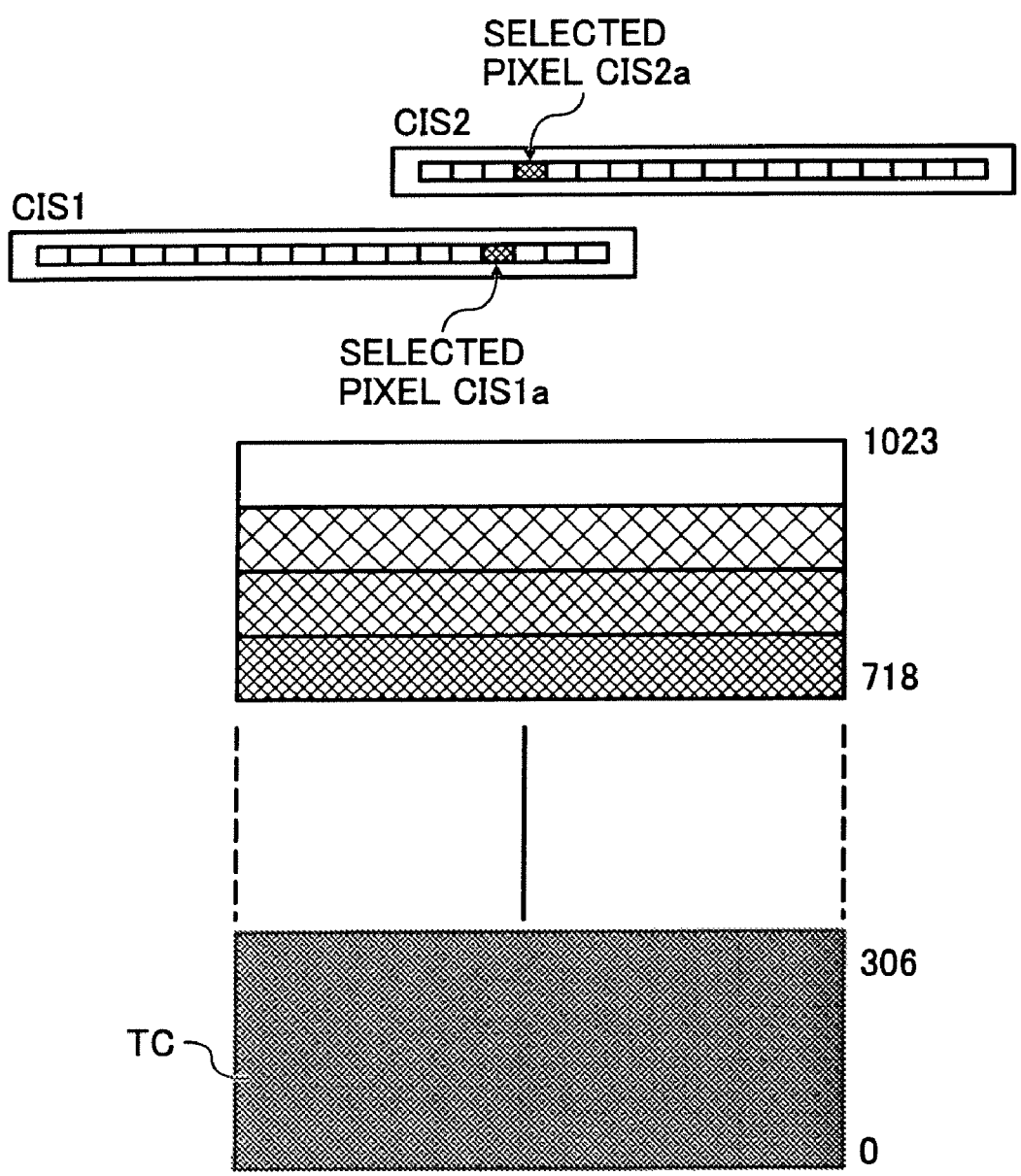
FIG. 9 is a schematic diagram showing a relationship of positions of respective selected pixels of image sensors of a test chart.

FIG. 9 shows a relationship of positions of selected pixels CIS1*a* and CIS2*a* of the first and second contact image sensors CIS1 and CIS2 and a test chart TC. In this case, the selected pixel CIS1*a* of the first contact image sensor CIS1 serves as a reference pixel.

The test chart TC may include 1024 levels of 10-bit concentrations, from black (level 0) to white (level 1023). In the exemplary embodiment of the present invention, the 10-bit concentrations of the test chart TC are divided into 20 steps. For obtaining respective gamma characteristics of the selected pixels CIS1*a* and CIS2*a*, the test chart TC is read or scanned in the image reading device 205 of the image forming apparatus 200 so that the first and second contact image sensors CIS1 and CIS2 can obtain data of the test chart TC. The read data that includes the gamma characteristics of the selected pixels CIS1*a* and CIS2*a* is stored in the storing part 14-4*b* of the gamma correction data producing part 14-4.

FIG. 10 is a table showing data obtained by reading the test chart TC with the first and second contact image sensors CIS1 and CIS2 shown in FIG. 9. The table of FIG. 10 shows results of input data, output data of the first and second contact image sensors CIS1 and CIS2, correction table including values of difference between the first and second contact image sensors CIS1 and CIS2, and corrected output data of the second contact image sensor CIS2 after the gamma correction has been conducted.

As shown in FIG. 10, when the input data is a concentration of level 1023, which represents a white level, the output data of the first and second contact image sensors CIS1 and CIS2 are a concentration of level 1023. Similarly, when the input data is a concentration of level 718, the output data of the first contact image sensor CIS1 is a concentration of level 718 and the output data of the second contact image sensor CIS2 is a concentration of level 512. When the input data is a concentration of level 512, the output data of the first contact image sensor CIS1 is a concentration of level 512 and the output data of the second contact image sensor CIS2 is a concentration of level 306. When the input data is a concentration of level 306, the output data of the first contact image sensor CIS1 is a concentration of level 306 and the output data of the second contact image sensor CIS2 is a concentration of level 154. Further, when the input data is a concentration of level 0, which represents a black level, the output data of the first and second contact image sensors CIS1 and CIS2 are a concentration of level 0.

Figure 11:
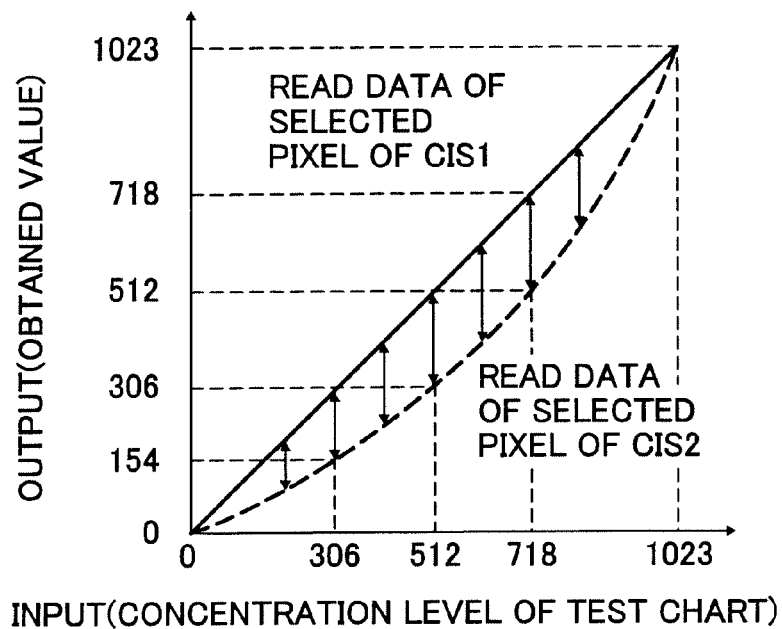
FIG. 11 is a graph of the correction characteristics, plotting the data of the table of FIG. 10.

FIG. 11 shows a graph of the correction characteristics, plotting the above-described data.

Before conducting the above-described operation, corrections on the concentration of white and the concentration of black have been conducted. Therefore, in the table of FIG. 10, the first and second contact image sensors CIS1 and CIS2 have respective identical values when the input data is concentrations of level 1023 (white) and level 0 (black). Accordingly, in the exemplary embodiment of the present invention, corrections on the concentration of white and the concentration of black can be previously conducted, as a premise, before producing gamma correction data.

In the exemplary embodiment of the present invention, the output values of the first contact image sensor CIS1 can be represented as a reference value. That is, the respective output values of the first contact image sensor CIS1 can be identical to respective values of the input data. Accordingly, the characteristic of the output values of the first contact image sensor CIS1 are shown in a linear shape in the graph of FIG. 11.

The characteristic of the first contact image sensor CIS1 in an actual image forming apparatus has been corrected to have a linear shape, based on the input data and the output data. Therefore, the exemplary embodiment of the present invention shows an example that the characteristic of the second contact image sensor CIS2 is corrected to the linear characteristic of the first contact image sensor CIS1.

For the above-described gamma correction, the computing part 14-4a of the gamma correction data creation part 14-4 calculates (DATA CIS1-CIS2) correction data based on the output data of a difference between the first contact image sensor CIS1 and the output data of the second contact image sensor CIS2, and store the results in the correction table in the storing part 14-4b. The values included in the correction data are represented by arrows shown in the graph of FIG. 11, drawn between a linear line of the first contact image sensor CIS1 and a curved line of the second contact image sensor CIS2.

If the correction data is added to the output data of the second contact image sensor CIS2, the values of the output data of the second contact image sensor CIS2 may turn to be the same as the values of the output data of the first contact image sensor CIS1. That is, the gamma characteristic of the second contact image sensor CIS2 may be effectively corrected to the output characteristic of the first contact image sensor CIS1.

The column of "corrected output of CIS2" in the correction table of FIG. 10 shows the values of the output data of the second contact image sensor CIS2 obtained after the gamma corrected has been conducted.

Figure 12:
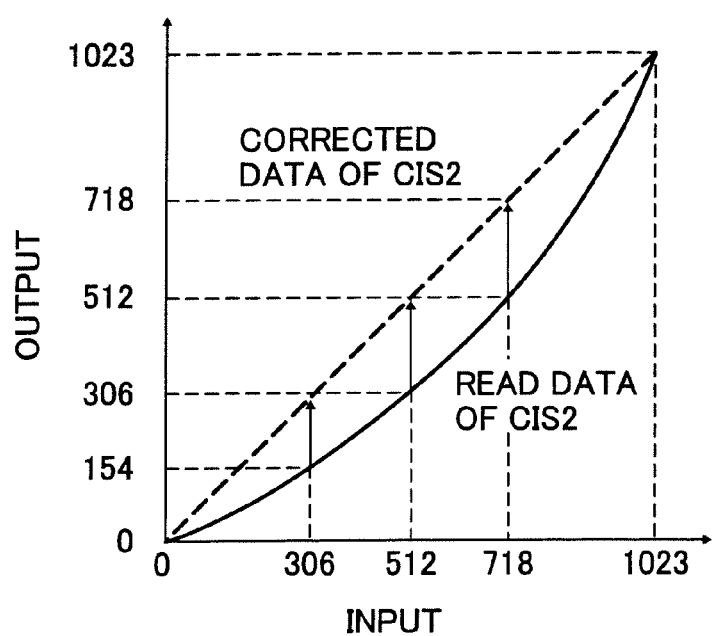
FIG. 12 is a graph showing a detailed plot of the corrected values of the output data of the image sensor of FIG. 11.

Further, FIG. 12 shows a detailed plot of the corrected values of the output data of second contact image sensor CIS2. As can be seen from the graph of FIG. 12, the input characteristic of the second contact image sensor CIS2 is corrected to a linear shape, so that the second contact image sensor CIS2 can have a same characteristic as the first contact image sensor CIS1.

In the exemplary embodiment of the present invention, the test chart TC includes 20 steps of concentrations. That is, 20 sets of input data, 20 sets of output data, and 20 sets of correction data are measured for the image forming apparatus 200. For example, concentrations of an output data includes 8 bits or 256 tones, for example, and the output data needs correction for each tone. In the above-described case, the correction data for each tone is interpolated into the 20 sets of data.

Alternatively, among concentrations of 256 levels, a concentration having a level that can be away from the above-described measuring points, which are levels 0, 306, 512, 718, and 1023, may be substituted by an average value between the measuring points, a central value, or so forth.

Since the measuring points employed in the table of FIG. 10 are 5 points or levels, the number of errors for the measurement may become greater. When 20 points or levels of the input data are employed, the correction data is practically sufficient.

Figure 13:
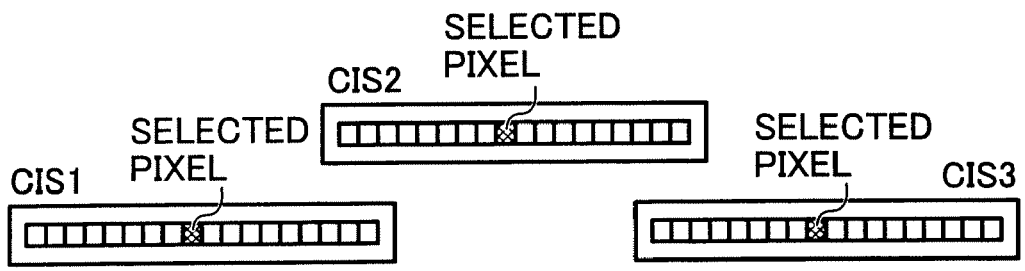
FIG. 13 is a schematic diagram of the image sensors.
Figure 14:
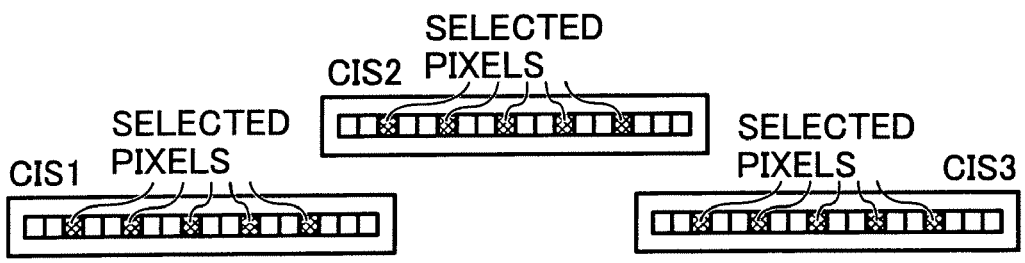
FIG. 14 is a different schematic diagram of the image sensors.
Figure 15:
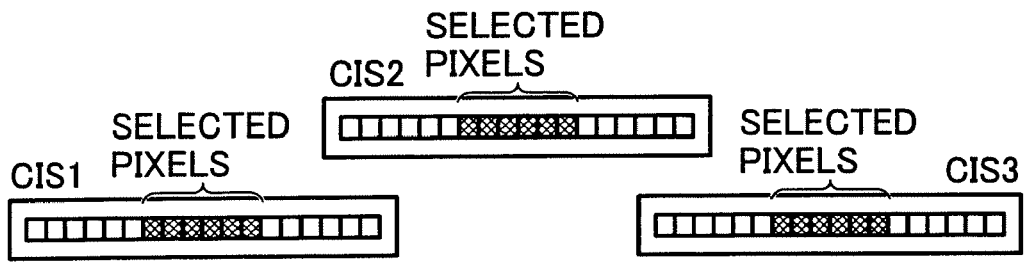
FIG. 15 is a different schematic diagram of the image sensors.

Referring to FIGS. 13 through 15, selected pixels used for the gamma correction are described.

One of the following gamma characteristics can be extracted and used to produce gamma correction data: a gamma characteristic based on one selected pixel of each of the first, second, and third contact image sensors CIS1, CIS2, and CIS3 as shown in FIG. 13; a gamma characteristic based on an average value of a plurality of randomly selected pixels of the first, second, and third contact image sensors CIS1, CIS2, and CIS3 as shown in FIG. 14; and a gamma characteristic based on an average value of a plurality of sequentially arranged selected pixels of the first, second, and third contact image sensors CIS1, CIS2, and CIS3 as shown in FIG. 15.

A test chart TC can be inserted into the image forming apparatus 200, and a CPU 101 (see FIG. 16) that can serve as a specifying mechanism determines and specifies each position of the selected single pixels of the first, second, and third contact image sensors CIS1, CIS2, and CIS3 in FIG. 13, the numbers and positions of the plurality of randomly selected pixels in FIG. 14, and the numbers and positions of the plurality of sequentially arranged selected pixels in FIG. 15.

For example, when the plurality of sequentially arranged selected pixels shown in FIG. 15 are read, the read data of the above-described selected pixels is averaged so that its gamma characteristic can be extracted or obtained. Based on the obtained gamma characteristic, gamma correction data is produced, as shown in FIG. 11.

Figure 16:
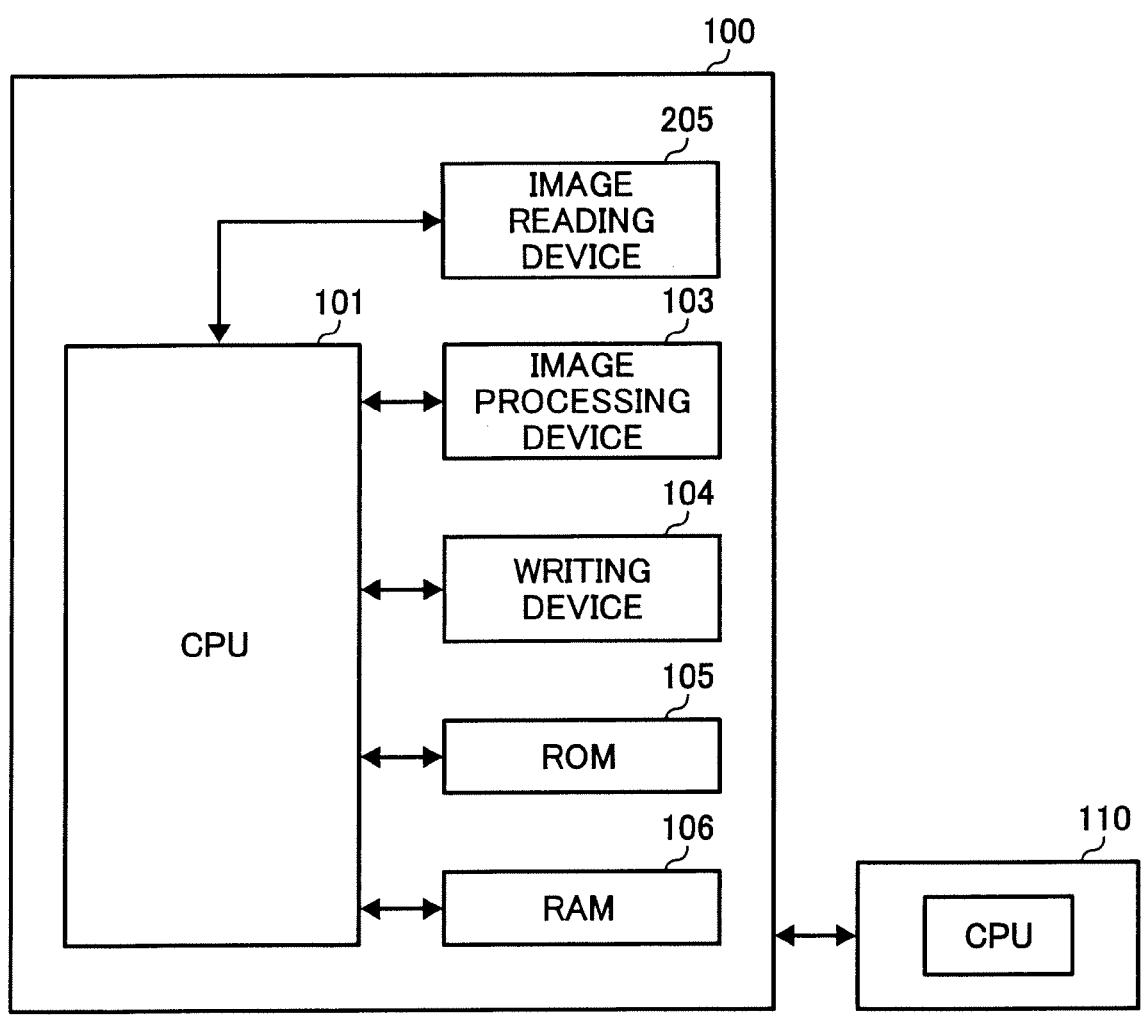
FIG. 16 is a block diagram of the image forming apparatus of FIG. 1.

Referring to FIG. 16, a block diagram of the image forming apparatus 200 is shown. FIG. 16 shows a schematic configuration of a controlling portion of the image forming apparatus 200 including the image reading device 205 (or a scanner 102) according to the exemplary embodiment of the present invention.

In FIG. 16, the image forming apparatus 200 includes an engine part 100 and an operation part 110. The engine part 100 includes a CPU 101, a scanner or the image reading device 205, an image processing device 103, a writing device 104, a read only memory or ROM 105, and a random access memory or RAM 106. The image processing device 103 executes image processing when converting the image data read by the image reading device 205 into rewritable image data. The writing device 104 optically writes the image data onto an image bearing member or a photoconductor (not shown).

The CPU 101 executes a program stored in the ROM 105, sends the program to the RAM 106, and executes the program. The operation part 110 of FIG. 16 inputs the image data of the test chart TC, and the CPU 101 determines and sets the positions and numbers of selected pixels of the first, second, and third image sensors CIS1, CIS2, and CIS3.

When a test chart is read for obtaining gamma correction data for a contact image sensor, a reference contact image sensor and a different contact image sensor to be corrected with reference to the reference contact image sensor. For example, when the test chart TC shown in FIG. 9 is read, the first contact image sensor CIS1 corresponds to the reference contact image sensor, and the second contact image sensor CIS2 corresponds to the different contact image sensor referred to for the correction.

Figure 17:
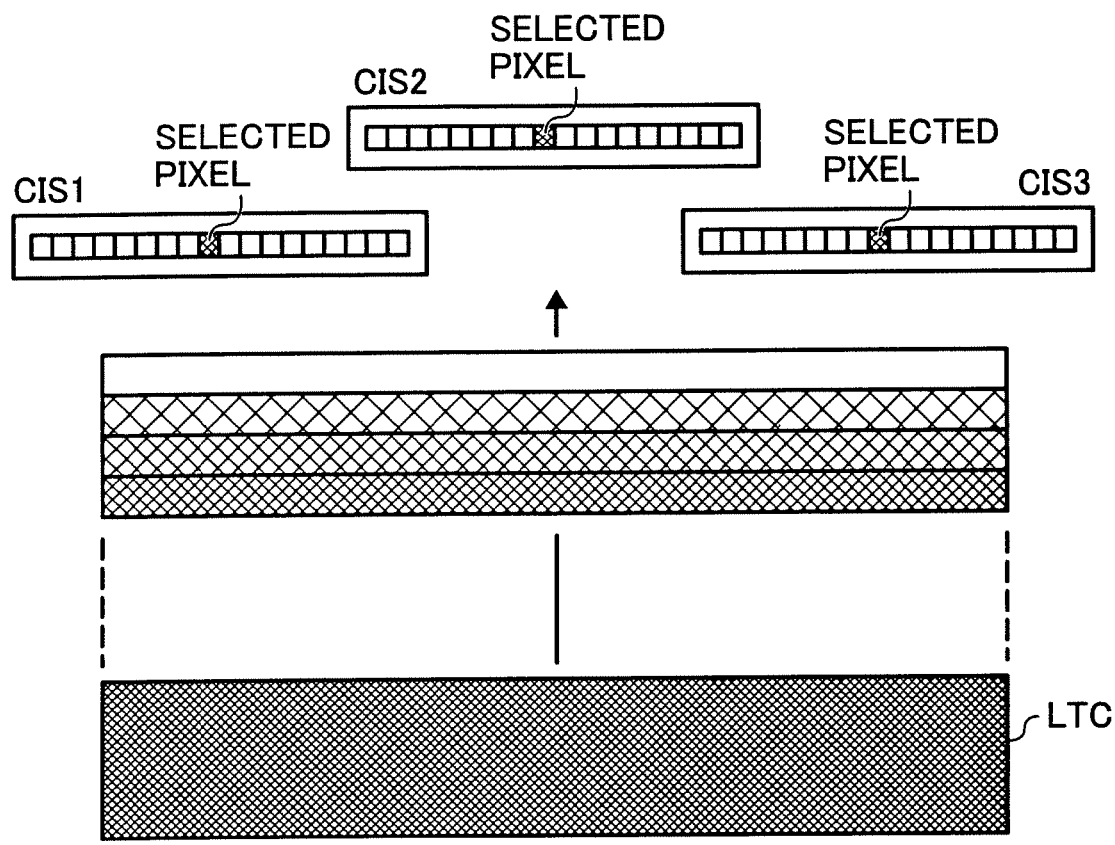
FIG. 17 is a schematic diagram of a large-sized test chart and the image sensors.

Alternatively, the first, second, and third contact image sensors CIS1, CIS2, and CIS3 as shown in FIGS. 11 through 13 can be used to read a large-sized original document. In a case in which such large-sized original document is used, as shown in FIG. 17, a large-sized test chart LTC having a wide width, as shown in FIG. 17, can be used to obtain data for gamma correction. The large-sized test chart LTC can cover the entire range of the first, second, and third contact image sensors CIS1, CIS2, and CIS3 in a width direction or a direction perpendicular to a traveling direction of the large-sized test chart LTC.

The image forming apparatus 200 of the image forming system 1000 shown in FIG. 1 can handle such large-sized test chart and large-sized recording sheets having a wide width. After the large-sized test chart LTC has been read, a selected pixel is selected and determined at any preferable position so as to obtain gamma correction data with respect to the whole of the first, second, and third contact image sensors CIS1, CIS2, and CIS3 simultaneously.

The image forming apparatus 200 that includes the image reading device 205 can generally conduct image forming operations with respect to an A0 size paper at maximum.

For reading an A3 size paper with a contact image sensor unit (not shown) provided in the image forming apparatus 200, three contact image sensors arranged in a zigzag alignment can be provided to the contact image sensor unit.

For reading an A4 size paper with the contact image sensor unit, five contact image sensors arranged in a zigzag alignment are provided to the contact image sensor unit.

Figure 18:
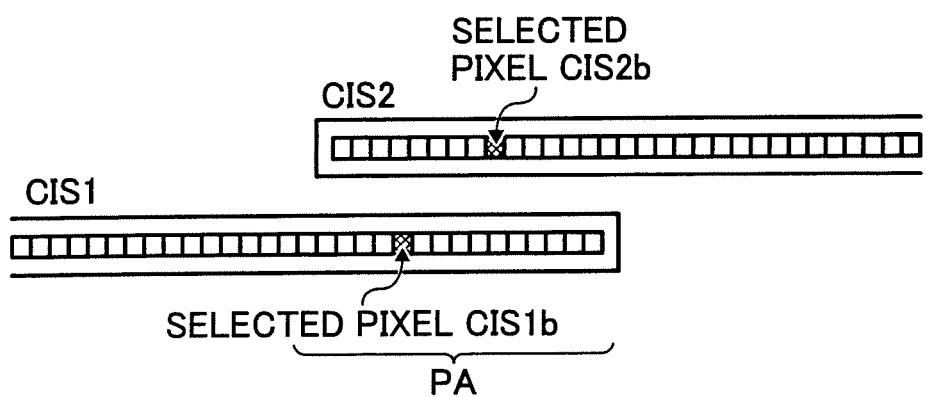
FIG. 18 is a schematic diagram of the image sensors.
Figure 19:
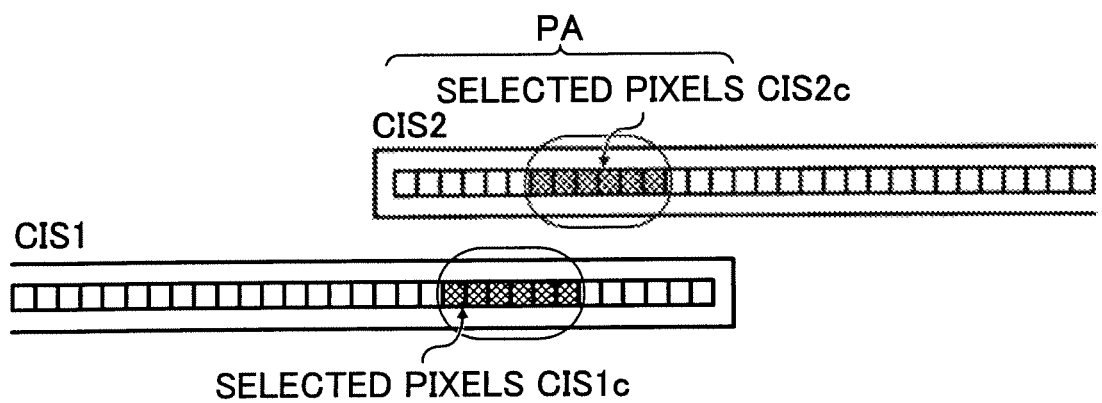
FIG. 19 is a different schematic diagram of the image sensors.
Figure 20:
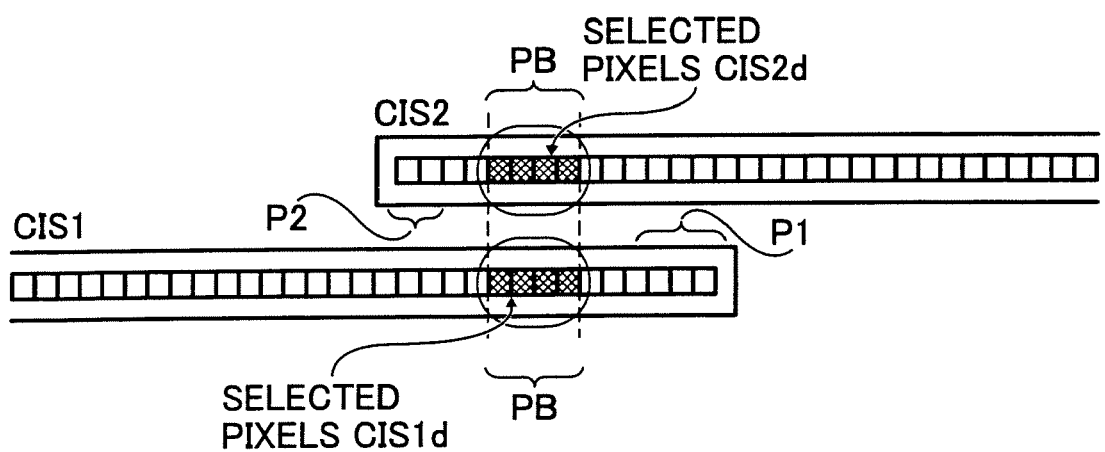
FIG. 20 is a different schematic diagram of the image sensors.

Referring to FIGS. 18 through 20, another example of selected pixels of the contact image sensors CIS1, CIS2, and CIS3 included in the image reading device 205 according to the exemplary embodiment of the present invention is described.

The selected pixels, shown in FIGS. 13 through 15, used for the gamma correction can be located on unoverlapped portions of the adjacent contact image sensors arranged in a zigzag alignment. On the contrary, selected pixels shown in FIGS. 18 through 20 can be located on overlapped portions of the above-described adjacent contact image sensors.

Specifically, in FIG. 18, a selected pixel CIS1b of the first contact image sensor CIS1 and a selected pixel CIS2b of the second contact image sensor CIS2 can be respectively selected from an overlapped portion PA of the first and second contact image sensors CIS1 and CIS2, and read by the image reading device 205. The respective gamma characteristics of the selected pixels CIS1b and CIS2b can be used to produce gamma correction data between the first and second contact image sensors CIS1 and CIS2 with the above-described operation process.

In FIG. 19, a plurality of selected pixels CIS1c of the first contact image sensor CIS1 and a plurality of selected pixels CIS2c of the second contact image sensor CIS2 can be respectively selected from the overlapped portion PA of the first and second contact image sensors CIS1 and CIS2, and read by the image reading device 205.

The plurality of selected pixels CIS1c and plurality of selected pixels CIS1c can be sequentially arranged respectively. The number of the plurality of selected pixels CIS1c and the number of plurality of selected pixels CIS1c can be equal.

The read data of the plurality of selected pixels CIS1c and the read data of the plurality of selected pixels CIS2c can be respectively averaged to obtain the respective gamma characteristics of the first and second contact image sensors CIS1 and CIS2. For example, when respective levels of the plurality of selected pixels CIS2c are 160, 162, 168, 154, and 150, the average value is 159.

Based on the above-described gamma characteristics of the first and second contact image sensors CIS1 and CIS2, gamma correction data between the first and second contact image sensors CIS1 and CIS2 can be produced.

In FIG. 20, a plurality of selected pixels CIS1d of the first contact image sensor CIS1 and a plurality of selected pixels CIS2d of the second contact image sensor CIS2 can be selected from a completely overlapped portion of the overlapped portion PA of the first and second contact image sensors CIS1 and CIS2, and read by the image reading device 205. The plurality of selected pixels CIS1d of the first contact image sensor CIS1 and the plurality of selected pixels CIS2d of the second contact image sensor CIS2 can include joint section adjusting pixels PB for adjusting seam joint sections of the overlapped portion PA of adjacent contact image sensors. The read data of the plurality of selected pixels CIS1d and the read data of the plurality of selected pixels CIS2d, or the joint section adjusting pixels PB, can be respectively averaged to obtain the respective gamma characteristics of the first and second contact image sensors CIS1 and CIS2.

Based on the above-described gamma characteristics of the first and second contact image sensors CIS1 and CIS2, gamma correction data between the first and second contact image sensors CIS1 and CIS2 can be produced.

A length of the joint section adjusting pixels PB can include 128 pixels in the exemplary embodiment of the present invention. Hereinafter, the joint section adjusting pixels PB can be referred to as a "pixel string PB", as required. When the pixel string PB is designated as a selected pixel string, gamma correction data can be produced by using an outer pixel or outer pixels that can be located outside the pixel string PB of each of the first and second contact image sensors CIS1 and CIS2.

In the above-described case, the outer pixels may not be used for reading image data of the original document 7. However, gamma correction data can be produced by using such outer pixels. For example, a test chart can be placed at a position that faces both of a pixel string P1 located from 128 pixels of an edge of the first contact image sensor CIS1 in the overlapped portion PA and a pixel string P2 located from 128 pixels of an edge of the second contact image sensor CIS2 in the overlapped portion PA.

The image reading device 205 can read the above-described test chart at a random timing including a period of an image reading operation, so that gamma correction data can be produced on an as-needed basis.

Further, a test chart can be different from the above-described sheet-type form. For example, a test chart can be formed or adhered on a roller. A test chart having patterns of various concentrations that are the same as the various concentrations of a sheet-type test chart can be formed or adhered onto a surface of a roller. That is, the image reading device 205 can internally have a test chart therein.

By reading the test chart formed on the surface of the roller, gamma correction data can be produced. Such a roller can be mounted on a position that can be read by contact image sensors such as the first, second, and third contact image sensors CIS1, CIS2, and CIS3.

With the above-described roller mounted as above, a sheet-type test chart may be unnecessary for producing gamma correction data. Without reading the sheet-type test chart at a desired timing, gamma correction data can be produced by reading the test chart on the roller according to instructions from an external device.

When adjusting and conforming gamma characteristics of the contact image sensors, the seam joint can greatly affect the gamma characteristics. Therefore, it is preferable that the joint section adjusting pixels PB are designated as selected pixels so as to produce the gamma correction data of the contact image sensors such as the first and second contact image sensors CIS1 and CIS2, as shown in FIG. 18 through 20.

When three contact image sensors are used, four sets of data on the overlapped portion PA may be needed, according to the example shown in FIGS. 18 through 20. In this case, the gamma correction data of a plurality of sequentially arranged selected pixels can be counted as one set of data.

On the other hand, for the example shown in FIGS. 13 through 15, three sets of data may be needed.

Accordingly, an optimal one of the example shown in FIGS. 13 through 15 and the example shown in FIGS. 18 through 20 may be selected based on target accuracy, memory capacity, and so forth, when producing gamma correction data.

According to the exemplary embodiment of the present invention, the gamma correction part 14 of the image reading device 205 of the image forming apparatus 200 corrects an output characteristic of each contact image sensor, based on reference gamma correction data. Therefore, image data to be output may not include a great difference in the characteristics of the contact image sensors.

Gamma correction data can be produced based on the gamma characteristic of a selected pixel of each contact image sensor. Therefore, minimum memory capacity is needed.

Gamma correction data can be produced based on an average value of the gamma characteristics of a plurality of selected pixels of each contact image sensor.

Therefore, gamma correction data that accounts for variation or non-uniformity in the output characteristics of each pixel can be produced.

Gamma correction data can be produced based on an average value of the gamma characteristics of a plurality of sequentially arranged selected pixels of each contact image sensor. Therefore, gamma correction data that accounts for variation or non-uniformity in the output characteristics of each pixel can be produced.

The number of pixels for producing gamma correction data can be designated. Therefore, gamma correction data that accounts for variation or non-uniformity in the output characteristics of each pixel and that corresponds to memory capacity can be produced.

The positions of pixels for producing gamma correction data can be designated. Therefore, gamma correction data that accounts for variation or non-uniformity in the output characteristic of the contact image sensors can be produced.

Gamma correction data can be produced based on the read data of the overlaid portions of the contact image sensors arranged in a zigzag alignment. Therefore, image deterioration is not caused at the seam joints.

A contact image sensor and an adjacent contact image sensor that is a correction target image sensor can compare respective output data corresponding to an identical input data. Based on the difference of the compared output data, the output characteristic of the correction target image sensor can be corrected. Therefore, correction processing can be conducted in a simple and easy manner.

Gamma correction data can be adjusted to a previously given gamma characteristic. Therefore, image data that does not cause any difference between image reading devices can be output.

Gamma correction data can be produced without referring to a test chart. Therefore, image data that does not cause any difference between image reading devices can be output.

The above-described example embodiments are illustrative, and numerous additional modifications and variations are possible in light of the above teachings. For example, elements and/or features of different illustrative and exemplary embodiments herein may be combined with each other and/or substituted for each other within the scope of this disclosure. It is therefore to be understood that, the disclosure of this patent specification may be practiced otherwise than as specifically described herein.

Obviously, numerous modifications and variations of the present invention are possible in light of the above teachings. It is therefore to be understood that, the invention may be practiced otherwise than as specifically described herein.

What is claimed is:

1. An image reading device, comprising:
a plurality of image sensors configured to read image data of an original document, each of which having a reading range overlapping in a main scanning direction with an adjacent image sensor from among the plurality of image sensors; and
a gamma correction mechanism configured to conduct gamma correction to correct linearity of respective output characteristics of the plurality of image sensors, based on gamma correction data produced according to an output characteristic of a reference image sensor selected from the plurality of image sensors,
wherein:
the adjacent image sensor is configured to act as a correction target image sensor, and
the reference image sensor and the correction target image sensor read identical input data, and the gamma correction mechanism compares output data of the reference image sensor and output data of the correction target image sensor, obtains a difference between these output data, and adjusts the output characteristic of the correction target image sensor to the output characteristic of the reference image sensor.

2. The image reading device according to claim 1, wherein:
the gamma correction data is produced based on a gamma characteristic of the reference image sensor according to a single selected pixel of the image data read by the reference image sensor.

3. The image reading device according to claim 2, further comprising:
a specifying mechanism configured to specify a position of the single selected pixel so as to obtain the gamma characteristic.

4. The image reading device according to claim 2, wherein:
the single selected pixel of the image data read by the reference image sensor is located in an overlapped portion of the reading ranges of the reference image sensor and the adjacent image sensor.

5. The image reading device according to claim 2, wherein:
the single selected pixel of the image data read by the reference image sensor is located outside an overlapped portion of the reading ranges of the reference image sensor and the adjacent image sensor.

6. The image reading device according to claim 1, wherein:
the gamma correction data is produced based on a gamma characteristic of the reference image sensor obtained according to an average value of a plurality of sequentially arranged selected pixels of the image data read by the reference image sensor.

7. The image reading device according to claim 6, further comprising:
a specifying mechanism configured to specify a number of the plurality of sequentially arranged selected pixels so as to obtain the gamma characteristic.

8. The image reading device according to claim 6, further comprising:
a specifying mechanism configured to specify a position of the plurality of sequentially arranged selected pixels so as to obtain the gamma characteristic.

9. The image reading device according to claim 6, wherein:
the plurality of sequentially arranged selected pixels of the image data read by the reference image sensor is located in an overlapped portion of the reading ranges of the reference image sensor and the adjacent image sensor.

10. The image reading device according to claim 6, wherein:
the plurality of sequentially arranged selected pixels of the image data read by the reference image sensor is located outside an overlapped portion of the reading ranges of the reference image sensor and the adjacent image sensor.

11. The image reading device according to claim 1, wherein:
the gamma correction data includes a previously given gamma characteristic.

12. The image reading device according to claim 1, wherein:
the gamma correction data is produced by using patterns provided internally.

13. An image reading device, comprising:
a plurality of image sensors configured to read image data of an original document, each of which having a reading range overlapping in a main scanning direction with an adjacent image sensor from among the plurality of image sensors; and
a gamma correction mechanism configured to conduct gamma correction to correct linearity of respective output characteristics of the plurality of image sensors, based on gamma correction data produced according to an output characteristic of a reference image sensor selected from the plurality of image sensors,
wherein the gamma correction data is produced based on a gamma characteristic of the reference image sensor obtained according to an average value of a plurality of randomly selected pixels of the image data read by the reference image sensor.

14. The image reading device according to claim 13, further comprising:
a specifying mechanism configured to specify a number of the plurality of randomly selected pixels so as to obtain the gamma characteristic.

15. The image reading device according to claim 13, further comprising:
a specifying mechanism configured to specify a position of the plurality of randomly selected pixels so as to obtain the gamma characteristic.

16. The image reading device according to claim 13, wherein:
the plurality of randomly selected pixels of the image data read by the reference image sensor is located in an overlapped portion of the reading ranges of the reference image sensor and the adjacent image sensor.

17. The image reading device according to claim 13, wherein:
the plurality of randomly selected pixels of the image data read by the reference image sensor is located outside an overlapped portion of the readings ranges of the reference image sensor and the adjacent image sensor.

18. An image forming apparatus, comprising:
an image forming device configured to perform a series of image forming operations; and
an image reading device comprising:
a plurality of image sensors configured to read image data of an original document, each of which having a reading range overlapping in a main scanning direction with an adjacent image sensor among the plurality of image sensors; and
a gamma correction mechanism configured to conduct gamma correction to correct linearity of respective output characteristics of the plurality of image sensors, based on gamma correction data produced according to an output characteristic of a reference image sensor selected from the plurality of image sensors,
wherein:
the adjacent image sensor is configured to act as a correction target image sensor, and
the reference image sensor and the correction target image sensor read identical input data, and the gamma correction mechanism compares output data of the reference image sensor and output data of the correction target image sensor, obtains a difference between these output data, and adjusts the output characteristic of the correction target image sensor to the output characteristic of the reference image sensor.

* * * * *